Aug. 15, 1967      J. M. TYRNER      3,335,459

CARTRIDGE HEATER CONSTRUCTIONS INCLUDING EXTRUSION DIES

Filed Feb. 12, 1965      2 Sheets-Sheet 1

INVENTOR
JOSEPH M. TYRNER
BY
ATTORNEY

Aug. 15, 1967   J. M. TYRNER   3,335,459
CARTRIDGE HEATER CONSTRUCTIONS INCLUDING EXTRUSION DIES
Filed Feb. 12, 1965                               2 Sheets-Sheet 2
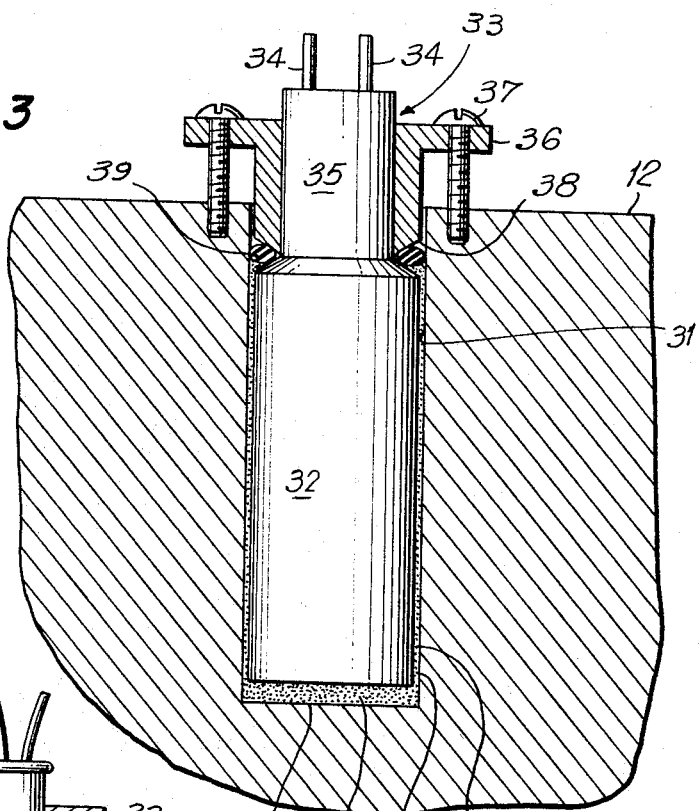
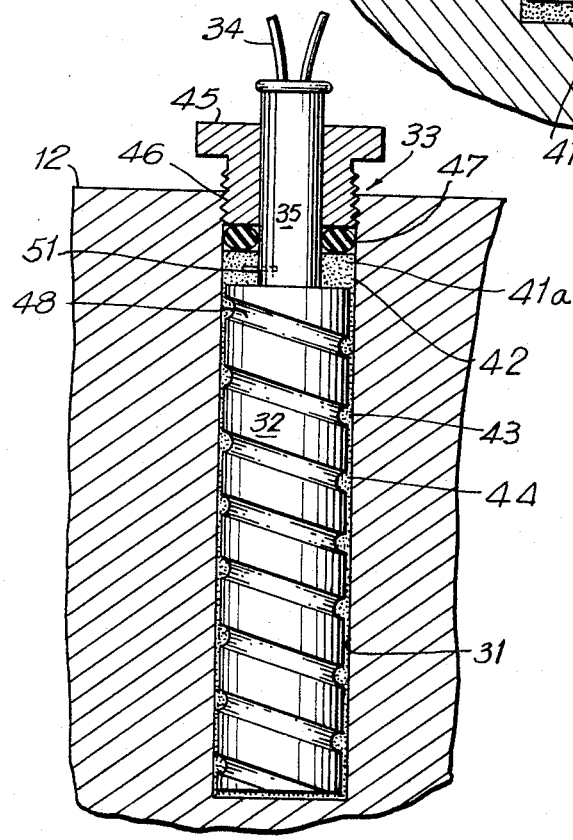
INVENTOR
JOSEPH M. TYRNER
BY Ernest A. Polin
ATTORNEY

United States Patent Office 3,335,459
Patented Aug. 15, 1967

3,335,459
CARTRIDGE HEATER CONSTRUCTIONS
INCLUDING EXTRUSION DIES
Joseph M. Tyrner, Brookside, N.J., assignor to Allied
Chemical Corporation, New York, N.Y., a corporation
of New York
Filed Feb. 12, 1965, Ser. No. 432,113
11 Claims. (Cl. 18—12)

This invention relates to cartridge heater structures in which one or more cartridge heaters are each positioned in an opening in the structure to be heated and, more particularly, to the construction of heated extrusion dies for forming plastic films provided with cartridge heaters for heating the dies.

Film extrusion dies provided with a plurality of cartridge heaters, each positioned in an opening in the die block with a close fit between the walls of the cartridge heater and the walls of the opening in which the cartridge heater is positioned, are used for the extrusion of thermoplastic films, including among other plastics, the polyolefins and polyhaloethylenes, e.g., polytrifluoromonochloroethylene. Such cartridge heaters must make a close fit with the openings in which they are disposed; tolerances are just sufficient to allow for removal and expansion with minimal reduction in thermal conductivity to the die block. Such close fit requires careful formation of the walls of the cartridge heaters and the openings in the die block in which the heaters are positioned, with close tolerance therebetween, and careful assembly of the cartridge heaters in their respective die openings. This adds greatly to the cost of the die.

The air film invariably present between the outer walls of each cartridge heater and the walls of the opening in which it is positioned is insulating and hence interferes with heat transfer to the die. Poor conduction leads to over-heating of the heaters and early burn-out. Moreover, the air film can cause erratic heating characteristics.

The necessary close tolerances for minimal reduction in thermal conductivity between the heater and the die block make removal of the cartridges difficult. When a cartridge fails and must be replaced, removal is difficult or impossible without drilling the cartridge out. The machining of the opening in drilling the cartridge out destroys the good fit and new cartridge heaters mounted in such openings perform inefficiently and usually have a shorter life. While removal can be made easier by a loose fit, the resultant construction has poor heat conducting characteristics because of the thicker air films in the loose fitting areas which films act as heat insulators with consequent poor heat transfer from the heater to the die body and give erratic heating characteristics. These objections to dies employing cartridge heaters apply to other structures involving such heaters.

It is a principal object of the present invention to provide an extrusion die or other structure having cartridge heaters, which die or other structure is free of the above noted objections.

Another object of this invention is to provide such die in which improved heat transfer takes place between each cartridge heater and the die block in which it is positioned and which permits ready removal and replacement of the cartridge heaters with the same improved heat transfer characteristics between the die block and the replaced heaters.

Other objects and advantages of this invention will be apparent from the following detailed description.

In accordance with this invention each cartridge heater is placed in an oversized hole or opening in the die block or other structure and the gap between the outer walls of the heater and the walls of the opening filled with a material of good heat conductivity, which material is in the liquid phase at the operating temperatures of the die. The preferred material is a metal, metal solder or alloy such as a lead-tin alloy having a composition close to that of the eutectic mixture. A commercial alloy containing 70% by weight of lead and 30% by weight of tin meets this requirement. Such an alloy is in the liquid phase at operating temperatures. Heat conducting salt solutions can be used, if desired.

Each cartridge-receiving opening can have a reservoir of such material therein, desirably in the solid phase, which, when the cartridge heater is energized, melts and the resulting liquid fills the gap between the cartridge heater and the walls of the hole or opening in which the cartridge heater is disposed, effecting the displacement of the air which would otherwise be present in this gap and giving good heat transfer from the heater to the die block.

In the accompanying drawings forming a part of this specification and showing for purposes of exemplification preferred forms of this invention, without limiting the claimed invention to such illustrative instances:

FIGURE 3 is a fragmentary section through a structure, such, for example, as a die block of an extrusion die, showing the heating cartridge in elevation in its opening in this structure; and FIGURE 4 is a fragmentary vertical section showing a modified form of heating cartridge in elevation within its opening in the structure to be heated by the cartridge heater.

Figure 1:
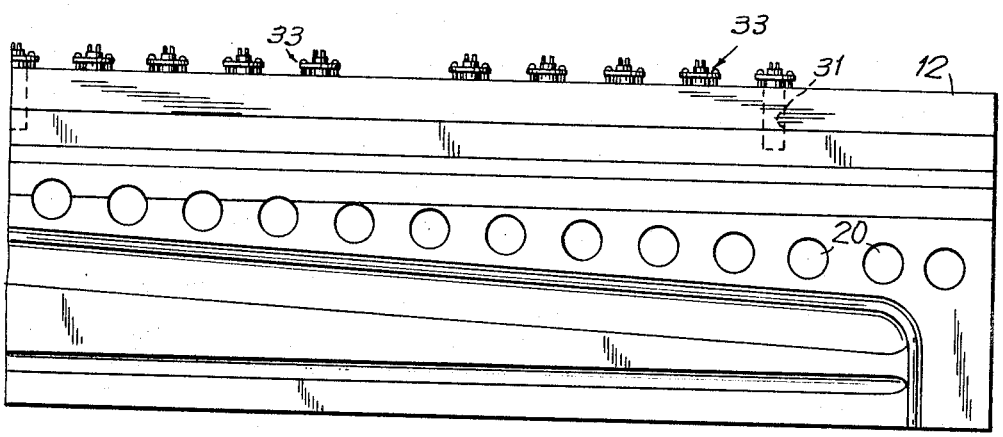
FIGURE 1 is a fragmentary elevational view of a die containing a plurality of cartridge heaters and shows approximately one-half the length of the die.
Figure 2:
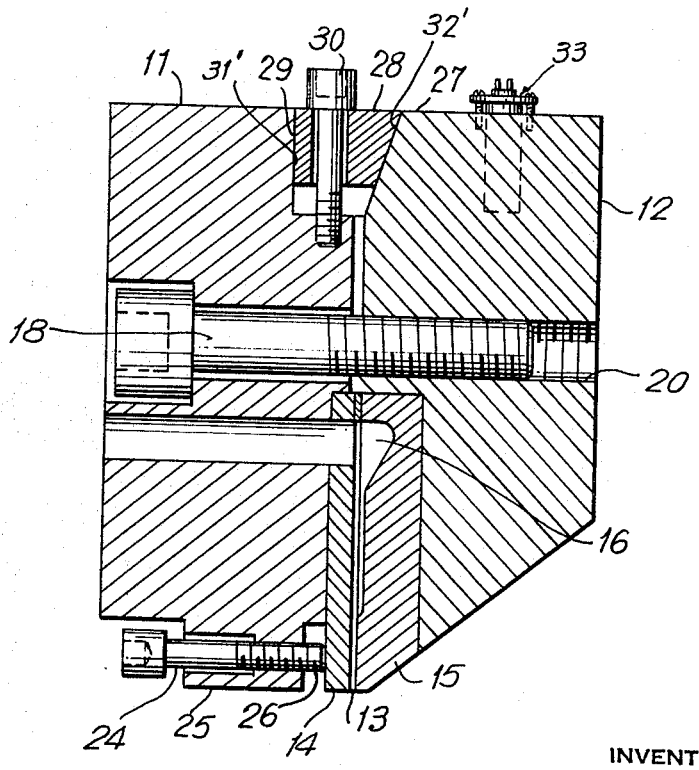
FIGURE 2 is a vertical section through the die of FIGURE 1.

For convenience in description, the extrusion die of FIGURES 1 and 2 will be described herein with the lower end thereof shown in FIGURES 1 and 2, referred to as the lower end of the die, the opposite end as the upper end, and the dimension at right angles to the section in which FIGURE 2 is taken as the length of the die. It will be understood that the die of FIGURES 1 and 2 represents one of many different forms of extrusion dies in connection with which the present invention can be employed, and that the invention is not limited to the type of die shown in FIGURES 1 and 2. Moreover, the invention is applicable to all constructions involving the utilization of removable and replaceable heating cartridges. While the description which follows will be confined chiefly to the extrusion die of FIGURES 1 and 2, the invention, however, is not limited thereto and, as noted, includes other forms of extrusion dies containing heating cartridges and other constructions employing removable and replaceable heating cartridges. It will be understood further that the die shown in FIGURES 1 and 2 can be positioned with the exit gap located to form a web film so that the end of the die containing the exit gap is positioned at the same level as the opposite end of the die. Hence the references to "lower," "upper," etc. are used herein in a relative sense only and the invention is not to be limited to an extrusion die positioned as shown in FIGURES 1 and 2.

The die of FIGURES 1 and 2 comprises longitudinally elongated supporting blocks 11 and 12, each extending substantially the full length of the extrusion slot or exit gap 13. A flat flexible insert 14 defining one face of the flow path to the extrusion slot 13 is suitably removably mounted on supporting block 11 in the locality of the area of abutment of blocks 11 and 12 as shown in FIGURE 2. Insert 14 can be held in place by removable screws or by making a close fit with its support or in any other desired manner. A die cavity insert 15 containing the die cavity 16 and defining the opposite face of the flow path leading from the die cavity 16 to the extrusion slot 13 is suitably removably mounted on the supporting block 12. The removable mounting for inserts 14 and 15 enables substitution of different inserts, with different die cavities, so that one and the same die can be used to produce different film widths.

In FIGURE 2 the spaced clamping bolts 18 are threaded into openings 20 in the supporting block 12. Clamping bolts 18 are positioned just above the die cavity 16 to insure maximum clamping action and hence a tight cavity, i.e., tight, packed joints along the border edges of the die cavity and the edges of the flow path leading from the die cavity to the exit gap 13.

Spaced adjustment bolts 24 are positioned along the length of lower edge 25 of supporting block 11 having their ends 26 bearing on the flexible insert 14. The exit gap 13 can thus be shaped as desired to control the thickness of the outflowing resin for optimum film profile.

Positioned at the upper end 27 of the die is an adjustment wedge 28 extending substantially the full length of the die. Wedge 28 runs longitudinally, i.e., parallel to the length of the die, and is positioned in opening 29 defined by a vertical wall 31' in supporting block 11 and inclined wall 32' in supporting block 12. These walls 31' and 32' cooperate with the walls of the wedge 28 providing bearing surfaces through which the positioning of wedge 28 in opening 29 effects adjustment of the depth or thickness of the flow path from the die cavity 16 to the exit gap 13 and also adjustment of the width of the exit gap 13. Wedge 28 is held in place once adjusted and adjustment thereof effected by screws 30 spaced along the length of the wedge and threaded into threaded openings in supporting block 11. Adjustment of position of wedge 28 in its opening 29 can be effected to change the thickness or depth of the flow path to the exit gap as well as the width of the exit gap to give optimum flow for any given resin.

As shown in FIGURE 1 and on a larger scale in FIGURES 3 and 4, the die block 12 has therein a series of openings 31 which can be drilled to size without reaming and without additional machining. Each of these holes is designed to receive the cartridge housing 32 of a cartridge heater 33. The drawings show a housing 32 of cylindrical contour, which is the preferred contour because of ease of manufacture and placement and removal from the oversize openings 31 in which the cartridge heaters are positioned. However, housings of other contour, including polygonal in cross-section, can be used if desired. The diameter of openings 31 are oversize relative to the outside diameter of cylindrical housing 32. Close tolerances are not required; the diameter of openings 31 are made sufficiently large to provide for easy insert of the cartridge heater 33 into and removal thereof from an opening 31.

The depth of openings 31 depends on the length of the cartridge heaters employed. Opening 31 should be deep enough to receive the cartridge heater 33 for the full length thereof which is heated.

Cartridge heater 33 preferably comprises a housing 32 of good heat conductivity, usually of metal, containing a resistance element supplied with current through the leads 34 protruding from head 35 of the cartridge heater. These cartridge heaters are positioned in openings 31 grouped in zones in the die block, each zone being provided with a connector bar (not shown) with which the leads 34 communicate.

The construction of the cartridge heater 33 per se can be of any known type. It need not be an electrical heater, although electrical heaters are preferred. For example, cylindrical or other shaped cartridges can be used supplied with suitable heating media such as steam or hot gases. Accordingly, further description of the known details of such heaters is believed unnecessary.

In the modification of FIGURE 3, the cartridge heater housing 32 has a head 35 of reduced diameter. As shown in FIGURE 3, the major portion of head 35 protrudes from the die block 12. Head 35 is not heated; the larger diameter housing 32 is heated for its full length. The depth of opening 31 is greater than the length of housing 32. Cartridge heater 33 is maintained in place in opening 31 in the die block 12 by gland 36 held in place on the die block by bolts 37 which thread into threaded openings in the die block. End 38 of gland 36 engages an insulation O ring 39 as shown in FIGURE 3 which minimizes loss of heat from the cartridge heater.

Opening 31 is provided at its base with a reservoir 41 of material 42 of good heat conductivity which is molten at operating temperatures. Preferably the housing 32 is coated with a metal solder or flux of good heat conductivity, liquid at operating temperatures. Commercially available solders or fluxes molten at operating temperatures and inert to the material of construction of housing 32 can be used. When the material 42 in the reservoir is a metal solder, the same material can be used to coat the exterior of the housing 32 and to fill the reservoir 41. The coating of housing 32 with the flux or solder facilitates the wetting of the walls of the housing 32 and opening 31 when the cartridge heaters are energized and the material 42 is rendered molten and rises to fill the gap 43 between the housing 32 and the walls defining opening 31, displacing any air therein and forming a liquid film 44 of good heat conductivity which gives good heat transfer from the cartridge heater to the die block.

In the modification of FIGURE 4, in which like parts are identified by the same reference characters, the cartridge heater has a cold head 35 of reduced diameter projecting through a gland nut 45 threaded into a threaded opening 46 in the die block 12. In this modification a reservoir 41a is provided just above the upper (viewing FIGURE 4) end of housing 32. A heat insulating seal 47 is positioned in the space between the top of reservoir 41a and the base of the gland nut 45. By positioning the reservoir 41a at or near the upper end of opening 31 dross in the metal alloy or flux employed collects in this reservoir where it does not interfere with heat transfer from the walls of the heating cartridge to the die block or other surface heated by the cartridge.

In the embodiment of the invention shown in FIGURE 4, the housing 32 has a helical groove 48 in its periphery. The depth and pitch of this groove can be varied, depending upon the desired heating characteristics of the cartridge heater. This groove facilitates the displacent of air from the gap 43 between the walls of housing 32 and the walls defining the opening 31. Desirably this groove is filled with the metal, metal alloy or flux of the same chemical composition as the material in the reservoir 41a. A mixture of metal alloy and flux can be used.

The walls of the cartridge heater are preferably provided with a coating of the metal, metal alloy or flux to facilitate wetting of the cartridge housing and the inside walls of the mounting opening when the cartridge heater is energized and the reservoir material fills the gap 43.

The helical groove 48 in the periphery of the cartridge housing 32 has the further important function of increasing the available heat transfer surface of the cartridge. Conventional cartridge heaters must have a substantially perfect cylindrical housing to obtain the necessary close fit between the walls of the housing and walls of the opening in which each cartridge heater is positioned. In the present invention, however, no direct contact between the walls of the housing and the walls defining the opening in which the housing is positioned is necessary; once the heater is energized, the material in the reservoir 41 or 41a is rendered molten and fills the gap 43 giving good heat transfer from the cartridge heater to the die block or other structure in which it is positioned.

The dimensions of the reservoir, whether positioned at the lower end of the opening 31, as in FIGURE 3, or near the top of this opening, as in FIGURE 4, will vary depending upon the size of the opening including its depth and the cartridge heater therein. The reservoir space should be large enough to enable the positioning therein of sufficient material 42 so that when molten, the molten material will completely fill the gap 43 for the full length of the effective heating surface of the cartridge heater.

In the embodiment of the invention shown in FIGURE 4, a resistor 51 in circuit with the leads 34 is positioned in the reservoir 41a. This resistor supplies heat to the material 42 in the reservoir 41a to melt this material before the temperature of the cartridge heater reaches its operating level. In this way the material 42 is rendered molten and fills the gap 43 before operation is started, giving improved heat transfer from the cartridge to the die block or other surface in which it is positioned from the commencement of operation.

Material 42 can be inserted in the reservoir 41 or 41a, desirably in the solid phase, in the form of pellets, granules or any other suitable form. In the modification of FIGURE 3, the material 42 is inserted in each opening 31 before placement of the cartridge heater 33 in its opening. In the FIGURE 4 modification, the cartridge heater 33 is first placed in its opening, the material 42 then introduced into the reservoir 41a, insulating seal 47 which can be in the form of an O ring then placed on top of the material 42 and the gland nut 45 having a self-tapping thread fitted into its bore at the top end of the opening 31.

The operation of the structures embodying this invention should be evident from the above description. When the cartridge heaters are energized, the material 42 whether in the reservoir at the lower or upper end of each opening 31 melts and the molten material fills the gap 43 to provide a liquid film of good heat transfer properties completely enveloping the entire heat transfer surface of the cartridge heater. While a construction involving a reservoir of heat transfer material which is rendered molten at operating temperatures at either of the ends of the cartridge heater or at both ends is preferred, this invention includes structures in which the cartridge heater has a coating of such heat transfer material on the housing thereof without a reservoir of such material being employed. When such cartridge heaters are inserted in their oversized openings, secured in place and energized, the coating melts to form the film of liquid heat-conducting material, completely filling the gap 43.

It will be noted that the present invention provides an extrusion die and other body or structures having one or more cartridge heaters each in an opening, in which structure improved heat transfer takes place between each cartridge heater and the die block or other structure in which it is positioned. The present invention permits ready removal and replacement of the cartridge heaters without requiring drilling the cartridge out. The same improved heat transfer characteristics are obtained between the replaced heaters and the die blocks or other structures in which they are positioned, as in the case of the cartridge heaters therein before replacement. Moreover, in the construction of the present invention it is not necessary to carefully machine the openings in which the cartridge heaters are disposed, nor is it necessary to have close tolerances between the cartridge heater housings and the openings in which they are positioned.

The present invention insures substantially complete removal of air films, invariably present in heretofore known constructions, in the space between the cartridge heater housings and the walls of the openings in which the housings are positioned. The structure of FIGURE 4 involving the helical groove in the periphery of the cartridge heater housing not only facilitates the elimination of such air film but also gives greater heat transfer surface area with consequent improved heating efficiencies.

Since different embodiments of this invention could be made without departing from the scope of this invention, it is intended that all matter contained in the above description or shown in the accompanying drawings shall be interpreted as illustrative and not in a limiting sense.

What is claimed is:

1. An extrusion die comprising a die block having at least one opening therein for the reception of a cartridge heater, said opening being dimensioned to receive a cartridge heater positioned in said opening, cartridge heater with a loose fit between the walls defining the opening and the walls of said cartridge heater, said opening comprising at one end thereof a reservoir containing a heat-conducting material, which material is in the solid phase at ambient temperatures and is molten at the operating temperatures of the extrusion die, whereby when said heater is energized said material melts and fills the space between said heater and the walls of the opening in which it is positioned to provide a liquid film with good heat transfer properties between the walls of the said heater and the die block in which said heater is positioned.

2. An extrusion die as defined in claim 1, in which the reservoir is at the lower end of the opening in which the cartridge heater is positioned and said material in the reservoir is a lead-tin alloy.

3. An extrusion die as defined in claim 1, in which the reservoir is at the upper end of said opening in which the cartridge heater is positioned and said material in the reservoir is a lead-tin alloy.

4. An extrusion die as defined in claim 1, in which said reservoir of heat-conducting material has therein a resistor which is energized when the heater is energized to effect melting of the material in the reservoir before the heater reaches its operating temperature level.

5. An extrusion die comprising a die block having at least one opening therein for the reception of a cartridge heater, said opening being dimensioned to receive a cartridge heater positioned in said opening, cartridge heater with a loose fit between the walls defining the opening and the walls of said cartridge heater, said cartridge heater being generally cylindrical in shape and having a helical groove in its periphery extending for substantially the full length thereof, said opening comprising a reservoir containing a heat-conducting material, said reservoir being positioned above the upper end of the cartridge heater housing, said material being rendered molten when the cartridge heater is energized with the molten material filling the space between the heater and the walls of the opening in which it is positioned providing a film of good heat transfer properties between the walls of the heater and the die block.

6. An extrusion die as defined in claim 5, in which the said material is a lead-tin alloy.

7. A cartridge heater adapted for insertion into an extrusion die, said cartridge heater comprising a housing the interior of which is adapted to be heated, said cartridge heater having a solid coating on at least a portion of its exterior walls, which coating is of heat-conducting material, is solid at ambient temperatures and is rendered molten at the operating temperatures of the cartridge heater.

8. A cartridge heater as defined in claim 7 having a helical groove in the exterior walls of the heater to be heated extending substantially the full length of said walls, said groove having therein a coating of said heat-conducting material.

9. A cartridge heater comprising a generally cylindrical housing of heat-conducting material having a resistance element in its interior and having on at least the exterior surface thereof intended to be heated a coating of a lead-tin alloy.

10. An extrusion die comprising a die block having at least one opening therein for the reception of a cartridge heater, a cartridge heater loosely positioned in said opening, said cartridge heater having a coating thereon of meltable heat-conducting material, said heat-conducting material being a solid at ambient temperature and having a melting point below the operating temperature of said extrusion die.

11. An extrusion die comprising a die block having at least one opening therein for the reception of a cartridge heater, a cartridge heater loosely positioned in said opening, and meltable heat-conduction material substantially completely coating the walls of said cartridge heater, said heat-conducting material being a solid at ambient temperature and having a melting point below the operating temperature of said extrusion die.

References Cited

UNITED STATES PATENTS

| | | | |
|---|---|---|---|
| 2,367,144 | 1/1945 | Shover | 18—30 |
| 2,462,308 | 2/1949 | Dinzl | 18—30 |
| 2,597,744 | 5/1952 | Morrison | 165—180 XR |
| 2,743,347 | 4/1956 | Porter | 219—246 XR |
| 2,778,062 | 1/1957 | Moslo et al. | 18—30 |
| 3,088,171 | 5/1963 | MacMillan | 18—38 |

WILLIAM J. STEPHENSON, *Primary Examiner.*